United States Patent [19]

Keltz et al.

[11] Patent Number: 4,518,145
[45] Date of Patent: May 21, 1985

[54] VALVE FOR REGULATING THE PRESSURIZED FLOW OF ABRASIVES, IN PARTICULAR BLAST MEDIA

[75] Inventors: Douglas Keltz, Levittown; Robert Heaton, Bristol, both of Pa.

[73] Assignee: Empire Abrasive Equipment Corporation, Langhorne, Pa.

[21] Appl. No.: 425,837

[22] Filed: Sep. 28, 1982

[51] Int. Cl.³ .............................................. F16K 7/07
[52] U.S. Cl. .................................... 251/5; 251/6; 251/7; 251/8
[58] Field of Search ................................. 251/4, 6–8

[56] References Cited

U.S. PATENT DOCUMENTS

| 143,907 | 10/1873 | Hyde | 251/7 |
|---|---|---|---|
| 1,024,876 | 4/1912 | Barbour . | |
| 1,024,877 | 4/1912 | Barbour . | |
| 1,683,322 | 9/1928 | Annis . | |
| 2,588,212 | 3/1952 | Custer . | |
| 2,986,160 | 5/1961 | Acomb | 137/505.22 |
| 3,197,173 | 7/1965 | Taubenheim | 251/6 |
| 3,285,563 | 11/1966 | Clarkson . | |
| 3,350,053 | 10/1967 | Schmitz . | |
| 3,436,054 | 4/1969 | Cole et al. . | |
| 3,982,724 | 9/1976 | Citrin | 251/7 |
| 4,243,034 | 1/1981 | Brandt | 251/6 |
| 4,372,304 | 2/1983 | Avakian et al. | 251/8 |

FOREIGN PATENT DOCUMENTS 191136 1/1923 United Kingdom .................. 251/6

Primary Examiner—Martin P. Schwadron
Assistant Examiner—Sheri Novack
Attorney, Agent, or Firm—Sperry, Zoda & Kane

[57] ABSTRACT

A valve for controlling flow of abrasive media from a blast tank to a nozzle, utilizes rollers for constricting a straight-through tube. In this way the valve meters the flow of the abrasive media into a blast hose through which air is directed under pressure as a carrier for the media. Contact with the media within the valve is limited to a radially constrictable tube adapted for ready replacement as the only component subject to the destructive characteristics of media such as mineral grit, sand, or the like. In association with the pinch tube housing, means is provided permitting ready interchange of manual and automatic tube-constricting assemblies. In the automatic configuration, the size of the valve orifice through which the media passes can be accurately and swiftly regulated by varying the pressure on a diaphragm. The control air pressure exerted on the diaphragm determines the extent to which the pinch tube may open under pressure directed through the blast hose, against the force of a spring mounted within the diaphragm housing. Fine adjustments, including selective pre-adjustment of the spring tension and tube constriction, aid in precise regulation of the media flow.

25 Claims, 5 Drawing Figures

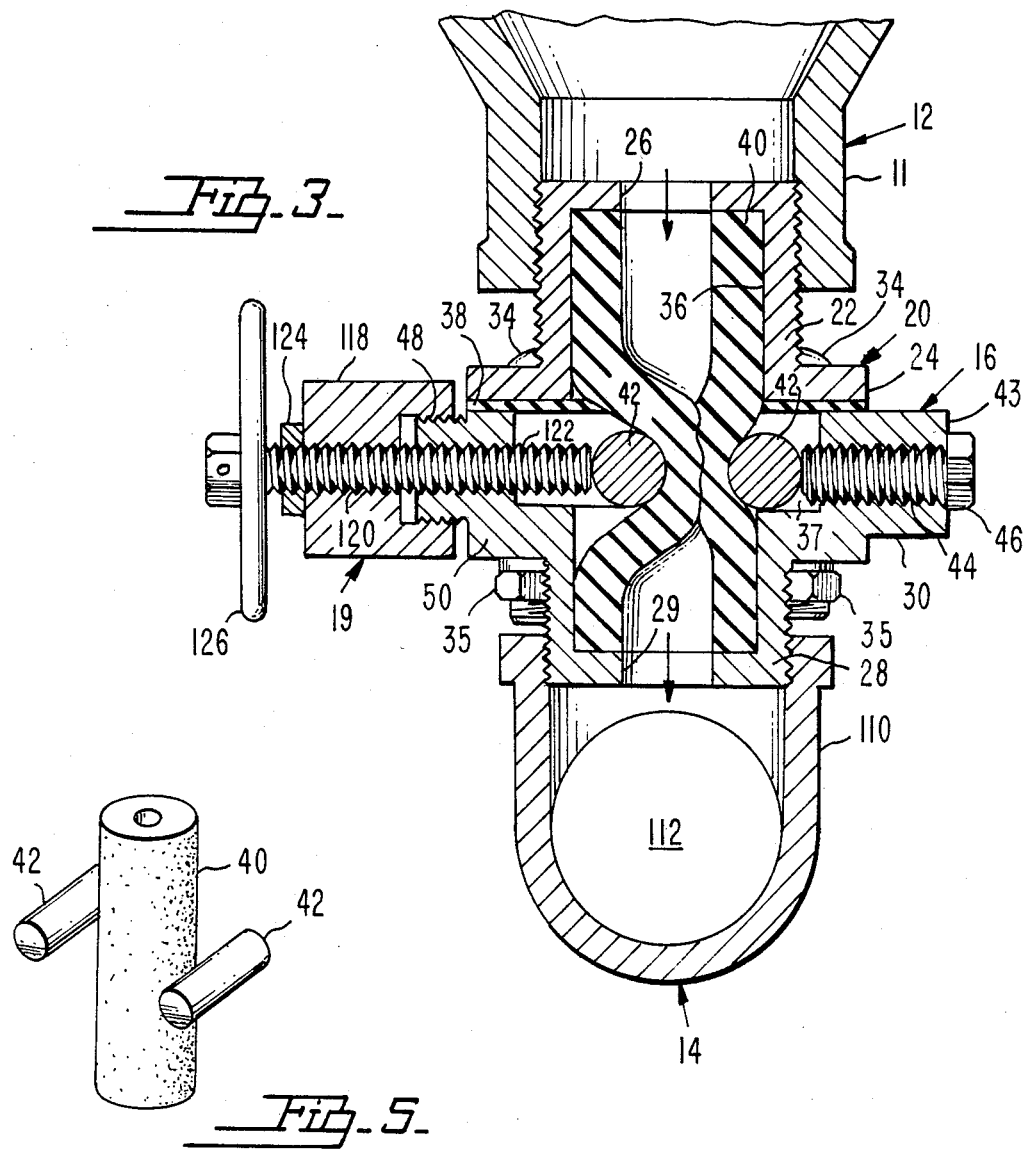
Fig. 3
Fig. 5
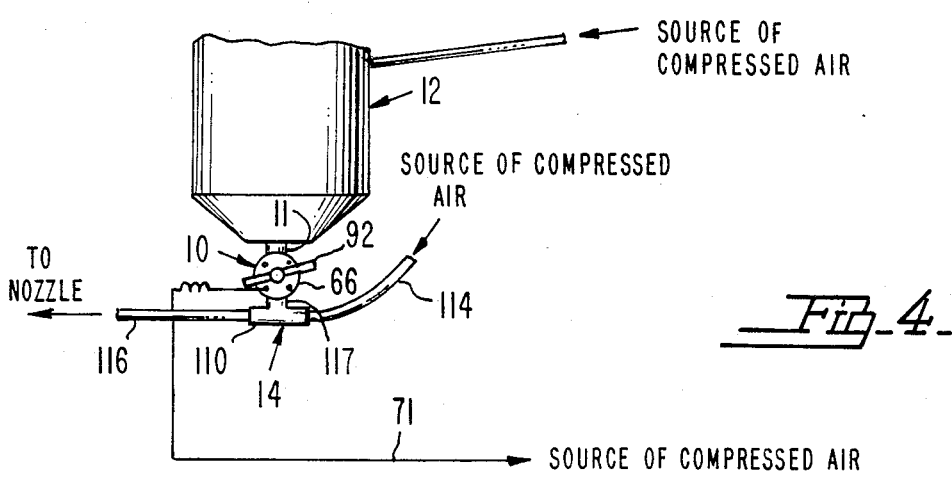
Fig. 4

VALVE FOR REGULATING THE PRESSURIZED FLOW OF ABRASIVES, IN PARTICULAR BLAST MEDIA

BACKGROUND OF THE INVENTION

1. Field of the Invention

The present invention relates, in general terms, to the handling of fluid materials under pressure. In a more particular sense, the invention is a valve designed especially for use in the blast-finishing field. In this industry, a wide variety of surfaces must be blasted with abrasive media for removing scale, rust, old paint, or the like, to prepare the surface for re-coating or other protective or conditioning procedures. The valve of the present invention is one in which manual and automatic control assemblies can be readily interchanged. In the automatic configuration, the valve incorporates a diaphragm which cooperates with a spring and with the pressure maintained in a blast hose, to regulate the insertion of media into the pressurized flow through the hose with a high degree of precision.

2. Description of the Prior Art

In the field in which the valve of the present invention is designed to function with particular effectiveness, many valves have been provided for the purpose of metering the flow of abrasive media into a blast hose. However, the valves previously devised, though in many cases functioning satisfactorily, have evidenced certain disadvantages.

A valve used to control the flow of abrasive media should desirably be designed in a manner to minimize wear on the parts of the valve resulting from contact with the media, and should facilitate the replacement of those parts. Heretofore, the valves commonly used in the blast-finishing field have had the disadvantages of presenting surfaces against which the media are directed, sometimes frontally and in other instances obliquely. In either event, this subjects the surfaces, against which the media are propelled at high velocity and under heavy pressures, to excessive wear. As a result, prior art valves of this type soon malfunction or lose their full efficiency. They consequently require total replacement, or in other instances require replacement of expensive components to which access is had with considerable difficulty.

The valves of the prior art, further, are of relatively complex construction, and yet have proved deficient as regards precise metering or regulation of the abrasive media into the pressurized carrier air directed through the blast hose. Especially are these deficiencies noted when the blasting operation is being carried out under difficult conditions and in particular with coarse media.

SUMMARY OF THE INVENTION

The present invention, summarized briefly, includes a pinch tube housing in which a radially compressable pinch tube is mounted. One end of the pinch tube is connectable to the outlet of a blast tank in which abrasive media are confined under pressure. The other end of the pinch tube is connectable to a pressurized conduit through which air under pressure flows to provide a carrier for the abrasive media metered into the conduit by the valve.

The pinch tube housing is readily separable, to permit swift replacement of the pinch tube, when the tube—the only part of the valve contacted by the media—becomes worn.

The pinch tube is designed to permit a straight flow of media through the valve, thus eliminating deficiencies noted in the prior art where the media passage through the valve is angular or tortuous.

In accordance with the invention, the tube is constricted by rollers, one of which can be pre-set in a selected tube-constricting position by an exteriorly accessible adjusting screw. The other roller is acted upon by a plunger. The plunger is axially shiftable toward and away from the pinch tube. In a manual version of the valve, the plunger position is adjusted by an exteriorly accessible T-handle. In an automatic version, a diaphragm housing is provided, confining a diaphragm and a spring. A control line to the diaphragm chamber permits remote, adjusted pressurization of the chamber. The spring resiliently, yieldably urges the plunger, in this version, to a position in which the pinch tube may be completely closed. The control air pressure on the diaphragm determines how far the tube can open against the pressure of the spring, providing a feature useful on large bulk blast tanks in that the operator does not have to crawl under the tank to adjust the media flow.

In the automatic version there is also provided a T-handle and a threaded plunger, which can be backed off to an out of the way position when the device is to be controlled remotely. The handle and plunger in the automatic version can, however, also be used to select the extent to which the pinch tube can be opened under the pressure of the carrier air passing therethrough.

The manual and automatic operating assemblies are particularly designed, in association with the pinch tube housing, to permit swift interchange or conversion, so that one can convert any valve from manual to automatic operation with speed and ease, or vice versa. This feature is also designed to simplify manufacturing processes, in that the pinch tube housing is designed for use either with the manual or with the automatic control assembly.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3 is a view similar to FIG. 2, in which the valve has been converted to manual operation;

FIG. 4 is a view on a reduced scale, partly in elevation with parts broken away and partly schematic, showing the automatic version of the valve in association with a blast tank, a blast hose, and associated sources of air under pressure; and FIG. 5 is an exploded perspective view of a pinch tube and a pair of rollers used to constrict the tube in a radial direction.

DETAILED DESCRIPTION OF THE PREFERRED EMBODIMENTS

Figure 1:
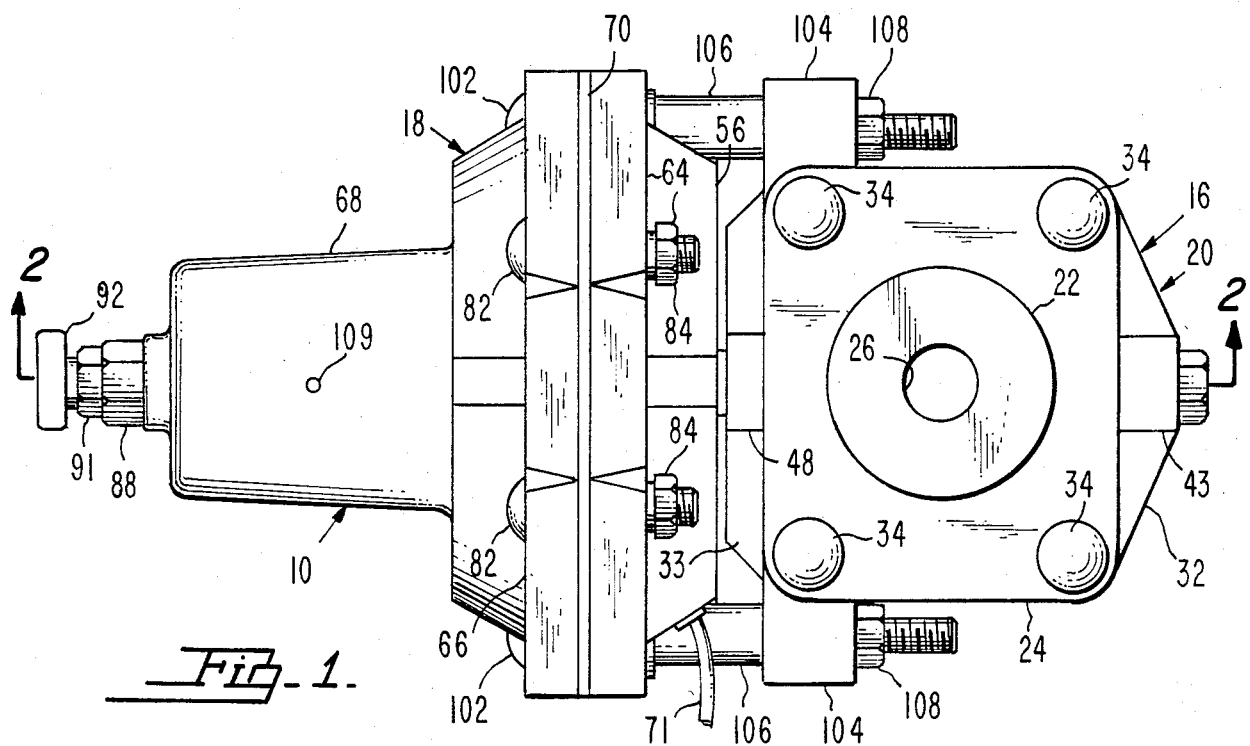
FIG. 1 is an elevational view of a valve for controlling the flow of abrasive media, in its automatic configuration.
Figure 2:
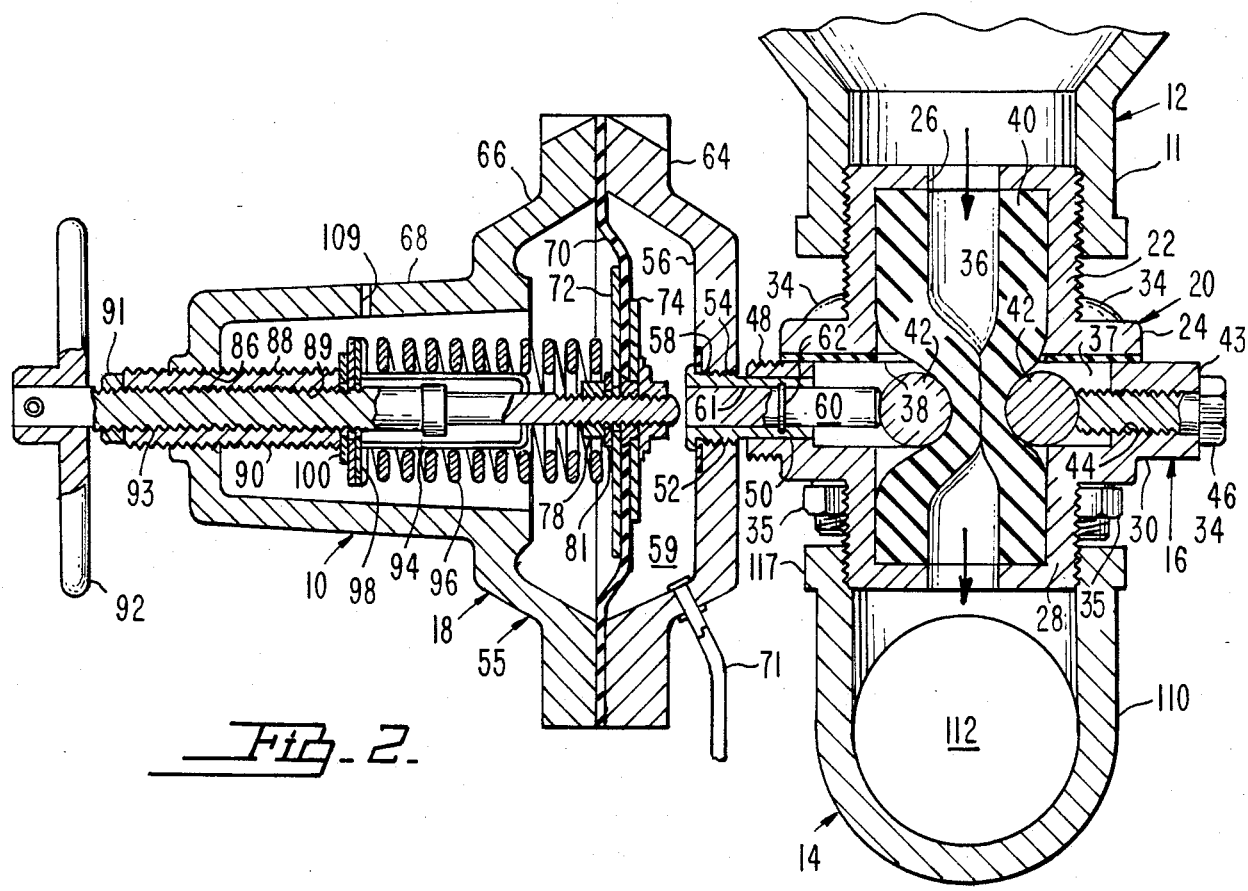
FIG. 2 is a longitudinal sectional view therethrough, substantially on line 2—2 of FIG. 1.

In FIGS. 1, 2, and 4 the valve comprising the present invention has been illustrated in its automatic configuration. In this form of the invention, the valve has been generally designated 10, and as shown in FIGS. 2 and 4, is attachable to the outlet 11 of a conventional blast tank generally designated 12.

A tank of the type with which the valve is used can be any of various capacities or sizes, but tanks of this type all have in common the characteristic of being pressurized by compressed air to a selectively controlled pressure. The tank holds abrasive media, which can be any of various types, such as mineral grit, sand, or metal grit, to state a few examples of typical abrasives employed for the purpose of blast finishing.

The valve 10 constituting the present invention is designed to control the flow of media from the pressurized tank into a conduit that may lead into or may itself comprise part of a blast hose extending to a discharge nozzle where the abrasive media is blasted under high pressure against the work surface, not shown.

In the illustrated embodiment of the invention, the valve is connected to a tee 14 so that the flow of abrasive media regulated by the valve may be injected into a stream of carrier air under a selected pressure, passing from a compressed air source through the blast hose to the discharge nozzle (also not shown).

The valve, in both the manual and automatic versions thereof, includes a pinch tube assembly generally designated 16. In the automatic version, the pinch tube assembly 16 is connectable to a diaphragm assembly generally designated 18. In the manual version (see FIG. 3) the pinch tube assembly 16 is connectable to a manual plunger assembly generally designated 19.

The pinch tube assembly 16 includes (FIGS. 1 and 2) a housing generally designated 20 and sectionally formed to include a first tubular housing section or body portion 22 having an attaching flange 24 at its inner end and a media inlet 26 at its other end; and a second housing section or tubular body portion 28, having at its outer end a media outlet 29 and having, at its inner end, an attaching flange 30 connectable to flange 24.

As seen from FIG. 1, section 28 of the housing 20 is formed, at opposite sides thereof, with outwardly projecting lips 32, 33, which are integral with transversely aligned projections apertured to receive a plunger and adjustment screw, respectively, and described in greater detail hereinafter.

The flanges 24, 30 have a rectangular series of registered apertures adapted to receive connecting bolts 34 having nuts 35, thus securing the housing sections tightly to form an elongated, continuous pinch tube chamber 36 having intermediate its ends an enlarged pinch tube roller cavity 37. A gasket 38 is interposed between the confronting flanges 24, 30.

Engaged in the chamber 36 is an elongated pinch tube 40 which can be formed of a durable, corrosion-resistant rubber or other material having qualities similar thereto. Initially, the pinch tube is manufactured so as to be of constant inner and outer diameter from end to end, and though offering resistance to being squeezed or pinched to close off flow therethrough in the manner shown in FIG. 3, the pinch tube is flexible enough to permit its being radially constricted or squeezed to a full closed position shown in FIG. 3.

In any event, the pinch tube is so designed as to normally be the only part of the valve that requires replacement. Replacement, as will be readily noted, is facilitated, by the construction of the pinch tube housing. One need only remove the nuts 35, to separate the parts or sections 22, 28. This permits replacement of the pinch tube, which becomes readily accessible by separation of the housing sections. At the same time, one can replace the gasket 38, insert a new pinch tube, and re-connect the housing sections.

The pinch tube, as will become fully apparent from the further description of the invention to be provided hereinafter, constitutes, for all practical purposes, the only part of the valve that is exposed to the abrasive media, the flow of which is to be controlled by the valve. This permits the replacement of a pinch tube at very low expense, without requiring the replacement, repair, or maintenance of any other components of the valve during normal use thereof over a long period of time.

Within the cavity 37, at opposite sides of the pinch tube, there are provided pinch tube rollers 42, 42. These have their lengths extended transversely to the pinch tube, in position such as to permit the rollers to compress or radially constrict the pinch tube to a partially or fully closed position, responsive to relative movement of the rollers toward each other in a direction transversely of the length of the pinch tube.

As previously noted herein, one of the housing sections, in this case the section 28, is formed at diametrically opposite locations with apertured, transversely aligned projections or bosses 43, 48. Boss 43 has a threaded opening 44, communicating with cavity 37, and adapted to receive a pinch roller adjustment screw 46. Screw 46 bears at its inner end against one of the rollers 42, and is adapted to pre-set roller 42 at any selected position radially, inwardly of the pinch tube roller. Thus, by adjusting screw 46 inwardly to its full extent, roller 42 shown at the right in FIG. 3 partially biases inwardly the wall of the pinch tube.

Diametrically opposite the boss or projection 30 is a projection 48 also integrally formed upon the housing section 28. This is externally threaded, to permit conversion of the valve for manual operation. A smooth-walled aperture formed in boss 48 communicates with cavity 37, and receives a plunger guide bushing 50 which projects exteriorly of the pinch tube housing. The projecting portion of guide 50 is threaded as at 52, for engagement in a threaded opening 54 formed in a diaphragm assembly generally designated 55.

The diaphragm assembly includes a diaphragm housing portion 56, having a shallowly dished central portion in which opening 54 is formed. Bushing 50 is headed, to compress an O-ring, to provide a seal for a diaphragm chamber 59.

An inner or first plunger element 60 is axially slidable within the bore 61 of bushing 50, and is fitted with O-ring 62 to prevent leakage of air under pressure from the diaphragm chamber 59 through bore 61.

Diaphragm portion 56 is provided, integrally, with a peripheral flange 64, in confronting relation to a corresponding flange 66 formed upon the inner end of a plunger housing 68 of the diaphragm assembly.

A diaphragm 70 is sealably, tightly compressed peripherally thereof between flanges 64, 66 and cooperates with diaphragm housing portion 56 in defining the chamber 59. Communicating with chamber 59 is a control tube 71, which would extend to a source of air under pressure (see FIGS. 2 and 4). At a location remote from the valve, one can supply a selected, adjustably controlled amount of air under pressure to the diaphragm chamber 59. The means for supplying the control air pressure to the diaphragm chamber is in and of itself conventional, and need not be illustrated herein, constituting simply a suitable, manually operable regulating valve used in association with a pressure gauge and a source of air under pressure, so as to permit air to be directed into and maintained within the diaphragm chamber at a selected, adjusted value.

The central portion of the diaphragm is confined between flat, metal washers 72, 74, tightly, sealably engaging the diaphragm between them through the provision of nuts 76, 78 threaded upon an intermediate or second plunger element 80. A gasket 81 compressed by nut 78 against plunger element 80 prevents leakage from the diaphragm chamber 59 at this location.

Referring to FIG. 1, at selected locations about the circumference of the diaphragm housing, bolts 82 and nuts 84 extend through registered apertures of the flanges 64, 66 to connect the same together in sealing relation to the diaphragm.

The plunger housing portion 68 of the diaphragm housing is of elongated formation, extending outwardly from the diaphragm chamber, and in its outer end has a threaded opening 86 receiving spring tension adjustment sleeve 88 which itself has a threaded axial bore 89 in which is engaged an outer or third plunger element 90.

In any position to which element 90 is axially adjusted within the bore of sleeve 88, the plunger element can be locked through the provision of a lock nut 91.

As will be noted, elements 90, 80 and 60 are all axially aligned in end-to-end relation, so that if the outer element 90 is adjusted axially inwardly in the direction of the pinch tube housing, the plunger 60 can be manually shifted in a direction to radially constrict the pinch tube. This characteristic will be brought out in further detail hereinafter, in a detailed discussion of the operation of the device.

On the outer end of the plunger element 90 there is provided a T-handle 92. The elements 90, 80, 60 together constitute a plunger means generally designated 93, and as shown in FIG. 2 there is utilized in association therewith a spring retainer cage 94 extending into a compression coil spring 96 held under compression between the diaphragm plate 72 and a collar or flange 98 provided upon the spring retainer. The spring retainer bears, at the end thereof having the collar 98, against a washer 100 that provides an abutment at the inner end of sleeve 88.

Referring to FIG. 1, for the purpose of assembling the diaphragm assembly with the pinch tube housing, there is provided a pair of elongated connecting bolts 102 extending through the peripheral portion of the diaphragm housing, toward the pinch tube housing, through projections 104 provided upon the pinch tube housing. Spacer sleeves 106 are interposed between the projections 104 and the adjacent flange 64 of the diaphragm housing, and nuts 108 are threaded onto the bolts 102 to complete the connection.

As previously noted, chamber 59 of the diaphgram housing is pressurized. At the opposite side of the diaphragm, however, normal ambient pressure exists, through the provision of a venting orifice 109 formed in the wall of the plunger housing portion of the diaphragm assembly.

In a preferred arrangement of cooperating components, there is provided (see FIGS. 2 and 4) a tee 110 which is per se conventional, including a through passage 112 to one end of which is connected a hose 114 comprising an inlet air hose extending from a source of compressed air, not shown, to the tee. The other end of the tee is connected to an outlet conduit or air hose 116, which would extend to a discharge nozzle, also not shown. Passage 112, and hoses 114, 116 cooperate to provide a conduit through which pressurized carrier air is directed, under selected, regulated pressure in a manner well known in the art, with the valve of the invention being adapted to insert or inject abrasive media in a selected ratio to the carrier air, for discharge through the blast nozzle.

The branch 117 of the tee is secured to the outlet end of the pinch tube housing, as shown in FIG. 2.

The description so far has been confined to the automatic embodiment of the invention. A purely manual version is also provided, however, and is shown in FIG. 3.

The invention is especially adapted to permit ready interchange between manual and automatic versions, and for this reason, the projecting portion of boss 48 is externally threaded to receive a sleeve 118 having a threaded bore 120 adapted to receive plunger 122, which can be locked in selected positions to which it is adjusted inwardly, through the provision of a lock nut 124. Exteriorly of sleeve 118, the plunger 122 has a tee handle 126.

Operation

In the embodiment of the invention shown in FIGS. 1 and 2, the valve is adapted to not only regulate the quantity of abrasive media fed from the tank 12 into the conduit leading to the hose nozzle, but also is designed to immediately shut off all flow from the tank automatically in the event of malfunction.

In normal use of the automatic embodiment of the valve, one would first pre-set the roller shown at the right in FIG. 2, through the provision of the adjustment screw 46.

The other roller 42 is also adjustably pre-set with respect to its normal maximum transverse spacing from the right hand roller 42 as viewed in FIG. 2. This can be achieved by threaded adjustment of the outer plunger element 90 inwardly or outwardly, as the case may be. The extent to which the plunger element 90 is adjusted outwardly determines the maximum extent to which the inner plunger element 60 can move outwardly of the pinch tube housing.

The pinch tube is opened by the pressure of the air passing therethrough, and in normal use of the valve, is maintained in this functional configuration as long as all operating conditions are normal and satisfactory. Thus, let it be assumed that in a particular blasting operation, a selected, regulated amount of abrasive media is to be fed into the conduit 112, on the basis of calculations that have been previously made. In these circumstances, the rollers 42 are pre-adjusted to a selected transverse spacing thereof, permitting the pinch tube to open only to the prescribed, permitted extent found suitable and desirable for the particular blasting operation. As a result, keeping in mind that the tank 12 is also pressurized to force the media therefrom in a stream of compressed air escaping from the tank when the pinch tube is open, the media will be ejected from the tank with the compressed air, through the pinch tube which, as already noted, has been permitted to open under the pressure of the air forced out of the tank 12, but only to the extent permitted by the pre-adjustment of the spacing between rollers 42. The media so injected into the air stream forced under pressure through conduit 112 is carried by that air stream to the nozzle, to blast the work surface, not shown.

If it be now assumed that a malfunction has occurred, as for example a broken hose, or a loose fitting somewhere in the system, causing a loss of air pressure anywhere within the system, this would be translated into a loss of air pressure within the tank, in the embodiment illustrated. This occurs by reason of the fact that all the pressurized areas of the system are interconnected, that is, the air pressure within the conduit, and the air pressure within the tank, in such a manner as to cause the loss of air pressure in any part of the system to result in a corresponding loss everywhere else in the system.

As a result, in these circumstances the pinch tube will instantly close under the pressure of spring 96. During normal operation, the pressure of spring 96 is countered by the air pressure used to force the pinch tube open, which under normal circumstances is greater than the spring pressure. The loss of air pressure within the tank, however, permits the spring pressure to be asserted instantly, so as to instantaneously close the pinch tube as the entire system shuts down.

The air pressure within the diaphragm chamber 59 is also affected by a loss of air pressure elsewhere within the system, that is, the air pressure in chamber 59 is lost at the same time as it is lost elsewhere in the system due to one of the above noted malfunctions. Accordingly, there is no air pressure within the diaphragm chamber 59 to oppose the expansion of the spring 96.

Under normal conditions, however, the air pressure within chamber 59 can be selectively adjusted, to vary the amount of media injected into the carrier air passing through conduit 112. This is done through the control air passage 71. As pressure within chamber 59 is increased, the diaphragm will be biased to the left in FIG. 2 against the restraint of the spring 96, permitting further movement of the plunger element 60 to the left in FIG. 2, so as to allow the pinch tube to open to a greater extent and thereby admit a greater quantity of media into the carrier air passing under pressure through conduit 112.

In some instances, if for one reason or another there is a malfunction and the pressure within tank 11 is still maintained, one can manually close the valve shown in FIG. 2, by biasing the series of plunger elements to the right in FIG. 2, through rotation of the T-handle 92, until the pinch tube is fully closed. This arrangement can also be used in instances in which the pressure within tank 11 is not automatically dropped in the presence of malfunctions elsewhere in the system.

Precision adjustments can be made, separately or in combination, in the valve shown in FIG. 2. Even during normal operation of the valve, the setting of roller 42 shown at the right in FIG. 2 can be adjusted, while the valve is operating, by re-positioning of the adjustment screw 46. Or, the T-handle 92 can be rotated to adjust the several plunger elements inwardly to adjust the extent to which the roller 42 shown at the left in FIG. 2 is permitted to move away from the cooperating pinch roller located at the opposite side of the pinch tube.

Further, even during normal operation of the valve, the tension of the spring 96 can be adjusted, since the exterior portion of the sleeve 88 is accessible to a user, permitting the sleeve 88 to be axially shifted to adjust the spring tension.

In the form of the invention shown in FIG. 3, all adjustments are manual. One simply selects an adjusted position for the roller 42 shown at the right in FIG. 3, by operation of the adjustment screw 46. One can also pre-select the extent to which the left hand roller 42 in FIG. 3 can move outwardly, that is, one can pre-select the spacing of the rollers 42, thereby in turn adjusting the extent to which the pinch tube can open under the pressure of the air within the tank 12.

In FIG. 3, if there is a malfunction, the valve is closed automatically, by shifting the plunger 122 inwardly until the pinch tube is fully closed.

A desirable feature of the invention, of course, is the ready interchangeability from manual to automatic or back again to manual. One simply removes the manual assembly 19, and attaches the automatic assembly shown in FIG. 2. The change is effected very quickly and easily, and involves no change whatever in the pinch tube housing. This permits field modification of the valve with maximum speed and ease, and of course also facilitates manufacturing operations, in that the same pinch tube housing can be made with either the manual or automatic versions of the device.

A highly desirable feature of the invention, of course, is the fact that the media has a straight-through flow from the tank into the hose. In prior art devices, a tortuous flow is typically provided, as a result of which the media are directed with great force against components of the valve, causing quick wear thereof and requiring that the valve be removed for replacement or repair. This involves considerable expense not only for the valve replacement itself, but also, even more importantly, with respect to down time for the entire equipment under circumstances requiring cessation of the blasting operations.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A valve for controlling flow from an outlet of a pressurized tank containing abrasive media to a remote point of discharge, comprising:

(a) a pinch tube housing of tubular formation defining a pinch tube chamber therein, said housing being formed open at both ends and having intermediate its ends transversely aligned portions having diametrically opposed side openings communicating with the chamber, said housing having one end adapted for connection to said outlet, the other end of the housing being adapted for discharge into a conduit that has a connection to a source of pressure fluid and leads to said discharge point;

(b) a pinch tube within said chamber adapted to be constricted radially so as to at times regulate the media flow and at other times stop said flow completely, said side openings opening upon opposite sides of the pinch tube, each of said opposite sides being deformable radially inwardly of the tube independently of the other side;

(c) first and second tube-constricting means within the housing disposed at opposite sides of the tube, said means being disposed within the pinch tube chamber between the side openings and the respective, opposite sides of the pinch tube in direct contact with said opposite sides of the pinch tube, each of said means being movable inside the pinch tube chamber independently of the other means in a direction transversely of the tube for constricting it radially;

(d) plunger means extending into the housing through one of said side openings and engaging one of said tube-constricting means for shifting it in said direction; and (e) means extending through the other side opening engageable with the other tube-constricting means and operable from outside the housing for adjusting the position of said other means relative to said one means.

2. A valve as in claim 1 wherein at least one of the side openings is threaded and the last-named means comprises a screw threadedly engaged in said one side opening.

3. A valve as in claim 1 in which the tube-constricting means comprises a pair of rollers.

4. A valve as in claim 3 wherein at least one of the rollers has a floating mounting within the housing.

5. A valve as in claim 4 wherein both rollers have a floating mounting within the housing.

6. A valve as in claim 5 wherein the rollers have their lengths extended transversely of the pinch tube.

7. A valve as in claim 6 wherein the rollers also have their lengths extended transversely of the plunger means and said screw.

8. A valve as in claim 1, said pinch tube being extended across the side openings, and tube-constricting means comprising a pair of rollers both having a floating mounting in the housing and respectively extending transversely of the side openings and housing between the pinch tube and the respective side openings, the plunger means comprising an elongated plunger projecting through one of the side openings and having one end bearing against one of the rollers, said last-named means comprising an elongated element projecting into the housing through the other side opening and bearing against the other roller, said plunger and said elongated element having their other ends projecting exteriorly of the housing, and means disposed exteriorly of the housing for axially shifting the plunger and said elongated element independently of each other to adjustably space the rollers apart transversely of the pinch tube in selective constricting relation to the pinch tube.

9. A valve as in claim 8 wherein the plunger and said threaded element are axially aligned with each other.

10. A valve as in claim 1 further including a tee comprising at least a portion of said conduit and having an inlet end connected to said source of fluid under pressure, an outlet end having a connection to the point of discharge, and a side inlet connected to said other end of the housing, for admixture of a supply of media and pressure fluid, emanating from the tank in a quantity regulated by selective constriction of the pinch tube, with pressure fluid directed through said conduit from said source.

11. A valve for controlling flow from an outlet of a pressurized tank containing abrasive media to a remote point of discharge, comprising:

(a) a pinch tube housing of tubular formation defining a pinch tube chamber therein, said housing being formed open at both ends and having intermediate its ends transversely aligned portions having diametrically opposed side openings communicating with the chamber, said housing having one end adapted for connection to said outlet, the other end of the housing being adapted for discharge into a conduit that has a connection to a source of pressure fluid and leads to said discharge point;

(b) a pinch tube within said chamber adapted to be constricted radially so as to at times regulate the media flow and at other times stop said flow completely, said side openings opening upon opposite sides of the pinch tube, each of said opposite sides being deformable radially inwardly of the tube independently of the other side;

(c) first and second tube-constricting means within the housing disposed at opposite sides of the tube, said means being disposed within the pinch tube chamber between the side openings and the respective, opposite sides of the pinch tube in direct contact with said opposite sides of the pinch tube, each of said means being movable inside the pinch tube chamber independently of the other means in a direction transversely of the tube for constricting it radially;

(d) plunger means extending into the housing through one of said side openings and engaging one of said tube-constricting means for shifting it in said direction;

(e) plunger-actuating means engageable with the plunger means and disposed exteriorly of the housing; and (f) means mounting said plunger means and plunger-actuating means on the housing adapted to permit swift conversion between a manual plunger-actuating means and a plunger-actuating means of the automatic type.

12. A valve as in claim 11 wherein the mounting means of the plunger means and plunger-actuating means comprises a boss on the housing in which one of said side openings is formed, the plunger means being axially shiftable in said one side opening, the manual plunger-actuating means including a sleeve threaded onto said boss, said plunger means being axially shiftable within the sleeve, the plunger-actuating means being in the form of a head secured to the plunger means and adapted to be gripped for axially shifting the plunger means.

13. A valve as in claim 12 wherein the sleeve has a threaded opening, the plunger means being threadedly engaged in said opening of the sleeve.

14. A valve as in claims 12 or 13 wherein said head is in the form of a handle.

15. A valve as in claim 13 wherein the opening of the boss is smooth-walled.

16. A valve as in claim 11 wherein the plunger means comprises a smooth-surfaced inner plunger element extending into the pinch tube chamber through said one side opening to engage said one tube-constricting means, said mounting means including a boss in which the plunger means is engaged for sliding axial motion.

17. A valve as in claim 15 wherein the plunger-actuating assembly includes a diaphragm assembly comprising a diaphragm housing and a diaphragm mounted therein adapted to bias the plunger element in a direction to close the pinch tube responsive to said pressure changes, said diaphragm housing having a connection to fluid under pressure controllable from a remote location to selectively control from said location the extent to which the pinch tube can expand.

18. A valve for controlling flow from an outlet of a pressurized tank containing abrasive media to a remote point of discharge, comprising:
(a) a pinch tube housing formed open at both ends and having one end adapted for discharge into a conduit that has a connection to a source of pressure fluid and leads to said discharge point;
(b) a pinch tube within the housing adapted to be constricted radially so as to at times regulate the media flow and at other times stop said flow completely;
(c) means within the housing disposed at opposite sides of the tube and relatively movable in a direction transversely of the tube for constricting it radially;
(d) plunger means extending into the housing and engaging one of said tube-constricting means for shifting it in said direction;
(e) plunger-actuating means engageable with the plunger means and disposed exteriorly of the housing; and
(f) means mounting said plunger means and plunger-actuating means on the housing adapted to permit swift conversion between a manual plunger-actuating means and a plunger-actuating means of the automatic type, the mounting means of the plunger means and plunger-actuating means comprising a boss on the housing having an opening in which the plunger means is axially shiftable, the manual plunger-actuating means including a sleeve threaded onto said boss, said plunger being axially shitable within the sleeve, the plunger-actuating means being the form of a head secured to the plunger means and adapted to be gripped for axially shifting the plunger means, the opening of the boss being smooth-walled, the plunger-actuating assembly including a diaphragm assembly comprising a diaphragm housing and a diaphragm mounted therein adapted to bias the plunger element in a direction to close the pinch tube responsive to said pressure changes, said diaphragm housing having a connection to fluid under pressure controllable from a remote location to selectively control from said location the extent to which the pinch tube can expand, the diaphragm assembly further comprising a second plunger element bearing against the first named plunger element in axial alignment therewith and secured to said diaphragm for biasing the first-named plunger element.

19. A valve as in claim 18 in which the second plunger element is threadedly adjustable within the diaphragm in an axial direction relative to the first named plunger element, for selectively determining the extent of movement of the first-named plunger element in a direction away from the pinch tube.

20. A valve as in claim 19 wherein the plunger-actuating assembly further includes spring means adapted to exert a continuous, resiliently yielding pressure tending to bias the diaphragm and said plunger elements in a direction toward the tube-constricting means, said spring means being normally restrained from exerting said bias by the pressure maintained in said conduit, said diaphragm, under the adjusted, remotely controlled pressure exerted thereagainst, being opposed to the force of said spring.

21. A valve as in claim 19 wherein the plunger-actuating assembly further includes means for adjusting the tension of the spring means.

22. A valve as in claim 21 wherein the tension-adjusting means comprises a spring-adjusting sleeve, said spring means being compressed between the diaphragm and said spring-adjusting sleeve and said spring-adjusting sleeve being axially adjustable toward and away from the diaphragm.

23. A valve as in claim 21 wherein the spring-adjusting sleeve is threadedly engaged in the diaphragm assembly.

24. A valve as in claim 23 wherein the plunger-actuating assembly further comprises a third plunger element threadedly engaged in the spring-adjusting sleeve and extending exteriorly of the diaphragm assembly for rotation by a user, said third element bearing against the second-named plunger element whereby to effect a primary, adjusted pre-setting of the diaphragm and said first and second plunger elements.

25. A valve as in claim 24 wherein the diaphragm assembly includes a handle on the third plunger element to facilitate rotation thereof by a user.

* * * * *